United States Patent
Ding et al.

(10) Patent No.: US 11,859,140 B2
(45) Date of Patent: Jan. 2, 2024

(54) INTEGRATED HYDROTREATING AND HYDROCRACKING WITH CONTINUOUS HYDROTREATING CATALYST REGENERATION

(71) Applicant: Saudi Arabian Oil Company, Dhahran (SA)

(72) Inventors: Lianhui Ding, Dhahran (SA); Zhonglin Zhang, Dhahran (SA); Saad A. Al-Bogami, Dhahran (SA); Sameer A. Al-Ghamdi, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 0 days.

(21) Appl. No.: 17/590,937

(22) Filed: Feb. 2, 2022

(65) Prior Publication Data

US 2023/0242824 A1    Aug. 3, 2023

(51) Int. Cl.
| | |
|---|---|
| *C10G 65/12* | (2006.01) |
| *C10G 47/28* | (2006.01) |
| *B01J 37/20* | (2006.01) |
| *B01J 38/02* | (2006.01) |
| *B01J 23/94* | (2006.01) |

(Continued)

(52) U.S. Cl.
CPC ........... *C10G 65/12* (2013.01); *B01J 23/883* (2013.01); *B01J 23/888* (2013.01); *B01J 23/94* (2013.01); *B01J 37/20* (2013.01); *B01J 38/02* (2013.01); *C10G 47/28* (2013.01); *C10G 2300/4081* (2013.01); *C10G 2300/4093* (2013.01); *C10G 2300/70* (2013.01)

(58) Field of Classification Search
CPC .............. C10G 65/12; C10G 47/28; C10G 2300/4081; C10G 2300/4093; C10G 2300/70; B01J 23/883; B01J 23/888; B01J 23/94; B01J 37/20; B01J 38/02
See application file for complete search history.

(56) References Cited

U.S. PATENT DOCUMENTS

| | | |
|---|---|---|
| 3,900,390 A | 8/1975 | Adams et al. |
| 5,445,728 A | 8/1995 | Sherwood, Jr. et al. |
| 9,255,230 B2 | 2/2016 | Shafi et al. |

(Continued)

OTHER PUBLICATIONS

Al-Attas et al., "Recent Advances in Heavy Oil Upgrading Using Dispersed Catalysts", Energy & Fuels, Jul. 2018.

(Continued)

*Primary Examiner* — Ellen M McAvoy
*Assistant Examiner* — Chantel Graham
(74) *Attorney, Agent, or Firm* — DINSMORE & SHOHL LLP

(57) ABSTRACT

An integrated hydrotreating and hydrocracking process includes contacting a hydrocarbon oil stream with a hydrogen stream and a hydrotreating catalyst in a moving-bed hydrotreating reactor, thereby producing a hydrocarbon product stream and a spent hydrotreating catalyst; contacting the hydrocarbon product stream with a second hydrogen stream and a hydrocracking catalyst in a hydrocracking reactor, thereby producing a hydrocracked hydrocarbon product stream; processing the spent hydrotreating catalyst to produce regenerated hydrotreating catalyst; and recycling the regenerated hydrotreating catalyst to the moving-bed hydrotreating reactor.

20 Claims, 2 Drawing Sheets

(51) Int. Cl.
  *B01J 23/883* (2006.01)
  *B01J 23/888* (2006.01)

(56) References Cited

U.S. PATENT DOCUMENTS

| | | |
|---|---|---|
| 10,005,971 B2 | 6/2018 | Dindi et al. |
| 11,084,992 B2 | 8/2021 | Ding et al. |
| 11,084,993 B2 | 8/2021 | Mukherjee et al. |
| 2002/0148757 A1* | 10/2002 | Huff, Jr. ............... C10G 45/08 208/213 |
| 2005/0032629 A1* | 2/2005 | Shih ...................... B01J 29/703 502/64 |
| 2014/0221712 A1 | 8/2014 | Greene et al. |
| 2016/0177200 A1 | 6/2016 | Powell et al. |
| 2021/0246387 A1* | 8/2021 | Koseoglu ............... C10G 45/44 |
| 2022/0064551 A1* | 3/2022 | Akah ..................... C10G 11/18 |

OTHER PUBLICATIONS

Notification of Transmittal of the International Search Report and the Written Opinion of the International Searching Authority, or the Declaration dated Apr. 13, 2023 pertaining to International application No. PCT/US2023/060463 filed Jan. 11, 2023.

* cited by examiner

INTEGRATED HYDROTREATING AND HYDROCRACKING WITH CONTINUOUS HYDROTREATING CATALYST REGENERATION

TECHNICAL FIELD

Embodiments of the present disclosure generally relate to refining and upgrading hydrocarbon oil, and pertain particularly to an integrated process and system for hydrotreating and hydrocracking hydrocarbon oil, including recycling of regenerated hydrotreating catalyst.

BACKGROUND

To convert crude oil directly to petrochemicals (olefin and aromatics), the first step is to hydroprocess crude oil to remove impurities (such as sulfur, nitrogen, and metals) and crack the large molecules in the heavy fractions to small molecules that are easily converted by steam cracking or aromatization processes. In an exemplary process, residue boiling at 540° C. and higher can be completely converted to residues boiling at less than 180° C., with 65-80% of the crude feedstock being converted to chemical products. In such processes, a fixed-bed reactor is typically used in the crude conditioning stage, also known as hydroprocessing, which can be split between hydrotreating and hydrocracking.

SUMMARY

Due to the high concentration asphaltene and other impurities (sulfur, nitrogen, and metals) in crude, hydrotreating catalysts deactivate very fast. The lifetime of hydrotreating catalysts become the bottleneck that limits overall run length and greatly influences the economics of crude processing. In order to achieve satisfactory run length, several trains of hydrotreating reactors must be built. When one train of the catalysts reaches its end of run, the feed is switched to another train. The spent catalysts in the deactivated train must be unloaded, and fresh catalyst must be loaded. This configuration causes very high investment and operation costs. Concurrently, a large amount spent catalyst is generated. Disposal of spent hydroprocessing catalyst requires compliance with stringent environmental regulations because of their hazardous nature and toxic chemicals content, which can also increase costs.

Therefore, there is a continual need for systems and processes for extending the lifetime of hydrotreating catalysts that also do not require the deactivation of hydrotreaters to replace the hydrotreating catalysts. Described herein are integrated processes and systems that allow for the hydrotreating of a hydrocarbon oil stream, hydrocracking of the hydrotreatment product, and recycling of regenerated hydrotreating catalyst. These processes and systems also allow for regenerated hydrotreating catalysts, new hydrotreating catalyst, or both to be fed back into the hydrotreater while the hydrotreater is active. The integrated processes and systems allow for complete conversion of hydrocarbon fractions with boiling points of greater than 540° C. into hydrocarbon fractions with boiling points less than 180° C. The integrated processes and systems also allow for hydrotreating catalyst lifetimes and hydrotreater run-times of three to five years.

In accordance with one embodiment herein, a process for hydrotreating and hydrocracking hydrocarbon oil includes contacting a hydrocarbon oil stream with a hydrogen stream and a hydrotreating catalyst in a moving-bed hydrotreating reactor, thereby producing a hydrocarbon product stream and a spent hydrotreating catalyst; contacting the hydrocarbon product stream with a second hydrogen stream and a hydrocracking catalyst in a hydrocracking reactor, thereby producing a hydrocracked hydrocarbon product stream; processing the spent hydrotreating catalyst to produce regenerated hydrotreating catalyst; and recycling the regenerated hydrotreating catalyst to the moving-bed hydrotreating reactor.

According to another embodiment herein, a system for hydrotreating and hydrocracking hydrocarbon oil includes a moving-bed hydrotreating reactor that hydrotreats a hydrocarbon oil stream and a hydrogen stream with a hydrotreating catalyst to form a hydrocarbon product stream and spent hydrotreating catalyst; a hydrocracker fluidly connected to the moving-bed hydrotreating reactor that cracks the hydrocarbon product stream and a second hydrogen stream to form a hydrocracked hydrocarbon product stream; a stripper fluidly connected to the moving bed hydrotreating reactor that strips the spent hydrotreating catalyst to form a stripped hydrotreating catalyst; and a catalyst regenerator fluidly connected to the stripper and the moving-bed hydrotreating reactor that regenerates the stripped hydrotreating catalyst to form a regenerated hydrotreating catalyst.

Additional features and advantages of the embodiments described herein will be set forth in the detailed description which follows, and in part will be readily apparent to those skilled in the art from that description or recognized by practicing the embodiments described, including the detailed description and the claims which are provided infra.

BRIEF DESCRIPTION OF THE DRAWINGS

The following detailed description of specific embodiments of the present disclosure can be best understood when read in conjunction with the following drawings in which.

Figure 1:
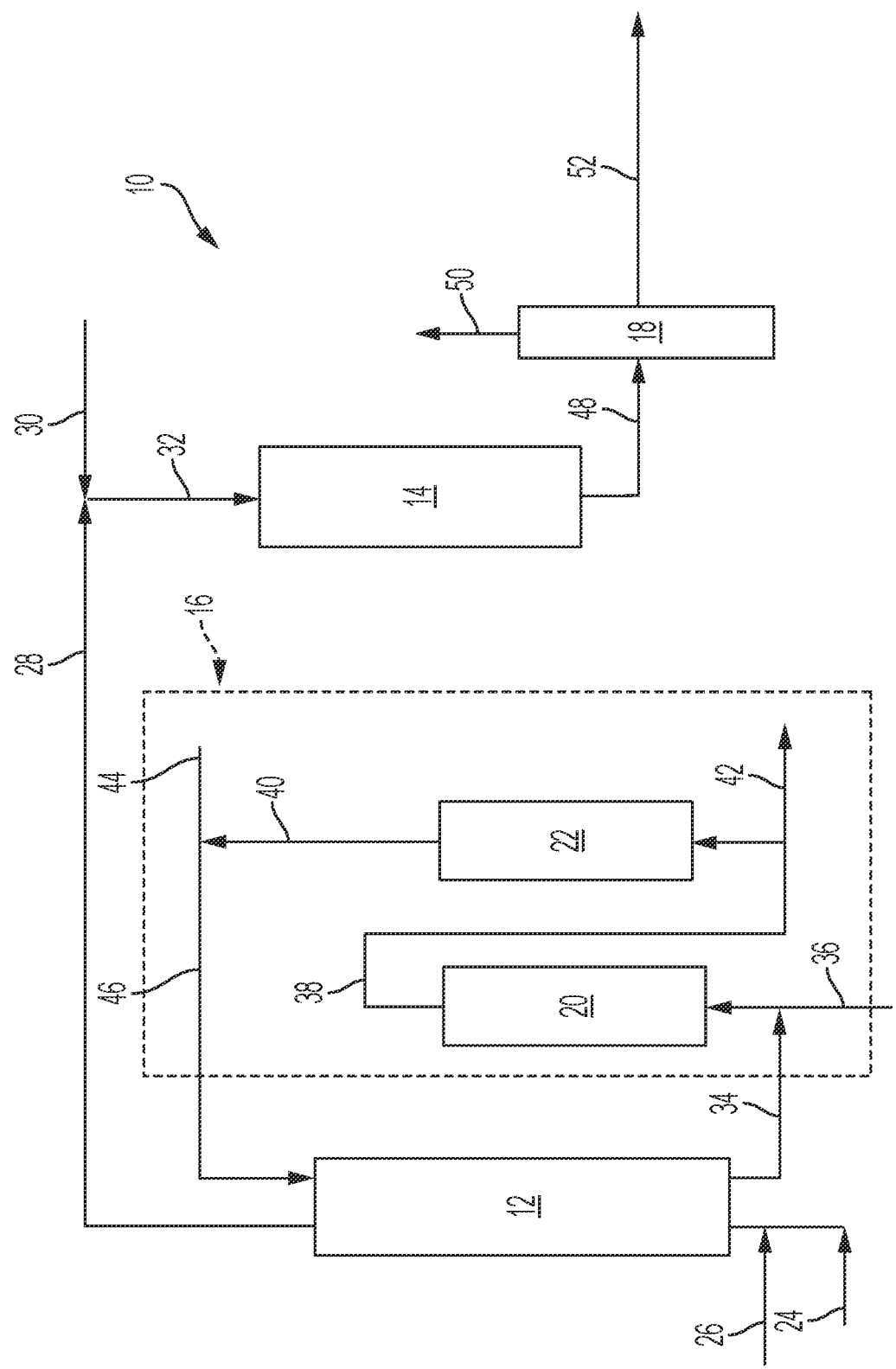
FIG. 1 illustrates a process flow diagram for an exemplary process in accordance with embodiments described herein.

For the purpose of describing the simplified schematic illustrations and descriptions of the relevant figures, the numerous valves, temperature sensors, electronic controllers and the like that may be employed and well known to those of ordinary skill in the art of certain chemical processing operations are not included. Further, accompanying components that are often included in typical chemical processing operations, such as air supplies, catalyst hoppers, and flue gas handling systems, are not depicted. Accompanying components that are in hydrocracking units, such as bleed streams, spent catalyst discharge subsystems, and catalyst replacement sub-systems are also not shown. It should be understood that these components are within the spirit and scope of the present embodiments disclosed. However, operational components, such as those described in the present disclosure, may be added to the embodiments described in this disclosure.

It should further be noted that arrows in the drawings refer to process streams. However, the arrows may equivalently refer to transfer lines, which may serve to transfer process streams between two or more system components. Additionally, arrows that connect to system components define inlets or outlets in each given system component. The arrow direction corresponds generally with the major direction of movement of the materials of the stream contained within the physical transfer line signified by the arrow. Furthermore, arrows, which do not connect two or more system components, signify a product stream, which exits the depicted system, or a system inlet stream, which enters the depicted system. Product streams may be further processed in accompanying chemical processing systems or may be commercialized as end products. System inlet streams may be streams transferred from accompanying chemical processing systems or may be non-processed feedstock streams. Some arrows may represent recycle streams, which are effluent streams of system components that are recycled back into the system. However, it should be understood that any represented recycle stream, in some embodiments, may be replaced by a system inlet stream of the same material, and that a portion of a recycle stream may exit the system as a product.

Additionally, arrows in the drawings may schematically depict process steps of transporting a stream from one system component to another system component. For example, an arrow from one system component pointing to another system component may represent "passing" a system component effluent to another system component, which may include the contents of a process stream "exiting" or being "removed" from one system component and "introducing" the contents of that product stream to another system component.

It should be understood that according to the embodiments presented in the relevant figures, an arrow between two system components may signify that the stream is not processed between the two system components. In other embodiments, the stream signified by the arrow may have substantially the same composition throughout its transport between the two system components. Additionally, it should be understood that in embodiments, an arrow may represent that at least 75 wt. %, at least 90 wt. %, at least 95 wt. %, at least 99 wt. %, at least 99.9 wt. %, or even 100 wt. % of the stream is transported between the system components. As such, in embodiments, less than all of the stream signified by an arrow may be transported between the system components, such as if a slip stream is present.

It should be understood that two or more process streams are "mixed" or "combined" when two or more lines intersect in the schematic flow diagrams of the relevant figures. Mixing or combining may also include mixing by directly introducing both streams into a like reactor, separation unit, or other system component. For example, it should be understood that when two streams are depicted as being combined directly prior to entering a separation unit or reactor, that in embodiments the streams could equivalently be introduced into the separation unit or reactor and be mixed in the reactor. Alternatively, when two streams are depicted to independently enter a system component, they may in embodiments be mixed together before entering that system component.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

Embodiments of the present disclosure are directed to processes and systems for hydrotreating and hydrocracking hydrocarbon oil and recycling the hydrotreating catalyst.

As used herein, a "catalyst" refers to any substance that increases the rate of a specific chemical reaction. Catalysts described in this disclosure may be utilized to promote various reactions, such as, but not limited to, cracking (including aromatic cracking), demetalization, desulfurization, and denitrogenation. As used herein, "cracking" generally refers to a chemical reaction where carbon-carbon bonds are broken. For example, a molecule having carbon to carbon bonds is broken into more than one molecule by the breaking of one or more of the carbon to carbon bonds, or is converted from a compound which includes a cyclic moiety, such as a cycloalkane, cycloalkane, naphthalene, an aromatic or the like, to a compound which does not include a cyclic moiety or contains fewer cyclic moieties than prior to cracking.

As used herein, the term "crude oil" is to be understood to mean a mixture of petroleum liquids, gases, or combinations of liquids and gases, including some impurities such as sulfur-containing compounds, nitrogen-containing compounds and metal compounds that have not undergone significant separation or reaction processes. Crude oils are distinguished from fractions of crude oil. As used herein, the crude oil may be a minimally treated crude oil to provide a crude oil feedstock having total metals (Nickel+Vanadium) content of less than 5 parts per million by weight (ppmw) and Conradson carbon residue of less than 5 wt. % Such minimally treated materials may be considered crude oils as described herein.

As used herein, the term "hydrogen/oil ratio" or "hydrogen-to-oil ratio" or "hydrogen-to-hydrocarbon oil ratio" refers to a standard measure of the volume rate of hydrogen circulating through the reactor with respect to the volume of feed. The hydrogen/oil ratio may be determined by comparing the flow volume of a hydrogen stream and the flow volume of a hydrocarbon oil feed or the flow volume of a second hydrogen stream and the flow volume of a hydrocarbon product stream.

As used herein, a "fixed-bed," specifically in reference to reactors, refers to a catalyst bed inside a reactor that is not displaced by fluids entering and exiting the reactor, i.e., the catalysts remain in place. Also as used herein, a "moving-bed," also specifically in reference to reactors, refers to a catalyst bed inside a reactor that is displaced by fluid entering and exiting the reactor, i.e., the catalysts do not remain in place. For moving-beds, catalyst may be carried with the fluid out of the reactor or the catalyst may not. Also for moving-beds, catalysts may be displaced such that they are suspended by the fluid as a fluidized bed.

As used herein, a "reactor" refers to a vessel in which one or more chemical reactions may occur between one or more reactants optionally in the presence of one or more catalysts. For example, a reactor may include a tank or tubular reactor configured to operate as a batch reactor, a continuous stirred-tank reactor (CSTR), or a plug flow reactor. Exemplary reactors include packed bed reactors such as fixed-bed reactors, and fluidized bed reactors. One or more "reaction zones" may be disposed in a reactor. As used herein, a "reaction zone" refers to an area where a particular reaction takes place in a reactor. For example, a packed bed reactor with multiple catalyst beds may have multiple reaction zones, where each reaction zone is defined by the area of each catalyst bed.

As used herein, the term "regenerated catalyst" or "regenerated hydrotreating catalyst" refers to catalyst that has been introduced to a cracking reaction zone and then regenerated in a regenerator to heat the catalyst to a greater temperature, oxidize and remove at least a portion of the coke from the catalyst to restore at least a portion of the catalytic activity of the catalyst, or both. The "regenerated catalyst" may have less coke, a greater temperature, or both compared to spent catalyst and may have greater catalytic activity compared to spent catalyst. The "regenerated catalyst" may have more coke and lower catalytic activity compared to fresh catalyst that has not passed through a cracking reaction zone and regenerator.

As used herein, a "separation unit" or "separator" refers to any separation device that at least partially separates one or more chemicals that are mixed in a process stream from one another. For example, a separation unit may selectively separate differing chemical species, phases, or sized material from one another, forming one or more chemical fractions. Examples of separation units include, without limitation, distillation columns, flash drums, knock-out drums, knock-out pots, centrifuges, cyclones, filtration devices, traps, scrubbers, expansion devices, membranes, solvent extraction devices, and the like. It should be understood that separation processes described in this disclosure may not completely separate all of one chemical constituent from all of another chemical constituent. It should be understood that the separation processes described in this disclosure "at least partially" separate different chemical components from one another, and that even if not explicitly stated, it should be understood that separation may include only partial separation. As used herein, one or more chemical constituents may be "separated" from a process stream to form a new process stream. Generally, a process stream may enter a separation unit and be divided, or separated, into two or more process streams of desired composition. Further, in some separation processes, a "lower boiling point fraction" (sometimes referred to as a "light fraction" or "light fraction stream") and a "higher boiling point fraction" (sometimes referred to as a "heavy fraction," "heavy hydrocarbon fraction," or "heavy hydrocarbon fraction stream") may exit the separation unit, where, on average, the contents of the lower boiling point fraction stream have a lower boiling point than the higher boiling point fraction stream. Other streams may fall between the lower boiling point fraction and the higher boiling point fraction, such as a "medium boiling point fraction."

As used herein, the term "spent catalyst" or "spent hydrotreating catalyst" refers to catalyst that has been introduced to and passed through a cracking reaction zone to crack a crude oil, such as the higher boiling point fraction or the lower boiling point fraction for example, but has not been regenerated in the regenerator following introduction to the cracking reaction zone. The "spent catalyst" may have coke deposited on the catalyst and may include partially coked catalyst as well as fully coked catalysts. The amount of coke deposited on the "spent catalyst" may be greater than the amount of coke remaining on the regenerated catalyst following regeneration.

It should further be understood that streams may be named for the components of the stream, and the component for which the stream is named may be the major component of the stream (such as comprising from 50 weight percent (wt. %), from 70 wt. %, from 90 wt. %, from 95 wt. %, from 99 wt. %, from 99.5 wt. %, or even from 99.9 wt. % of the contents of the stream to 100 wt. % of the contents of the stream). It should also be understood that components of a stream are disclosed as passing from one system component to another when a stream comprising that component is disclosed as passing from that system component to another. By way of non-limiting example, a referenced "hydrogen stream" passing from a first system component to a second system component should be understood to equivalently disclose "hydrogen" passing from a first system component to a second system component, and the like.

Referring initially to FIG. 1, an integrated system 10 for hydrotreating and hydrocracking hydrocarbon oil is illustrated. The integrated system 10 includes a moving bed hydrotreating reactor 12, a hydrocracking reactor 14, and a catalyst reclamation unit 16. The catalyst reclamation unit 16 includes a stripper 20 and a catalyst regenerator 22. As is meant to be shown in FIG. 1, and in embodiments, the moving bed reactor 12 may be an ebullated-bed hydrotreating reactor.

Figure 2:
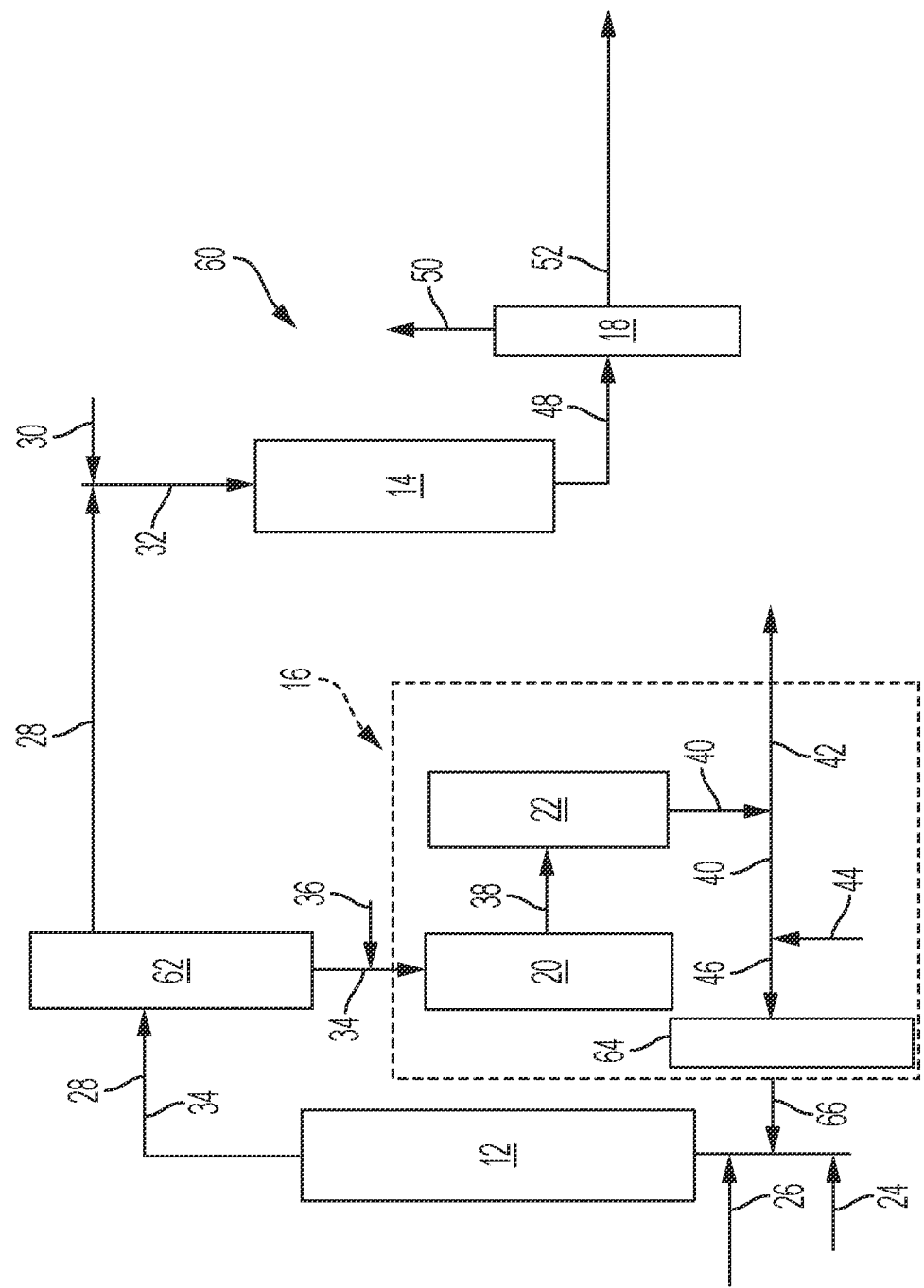
FIG. 2 illustrates a process flow diagram for an exemplary process in accordance with embodiments described herein.

Now referring to FIG. 2, an integrated system 60 for hydrotreating and hydrocracking hydrocarbon oil 26 is illustrated. The integrated system 60 may include any of the integrated systems 10 previously or hereinafter discussed as well as additional components. As is meant to be shown in FIG. 2, and in embodiments, the moving bed reactor 12 may be a slurry-bed hydrotreating reactor. As used herein, "slurry-bed hydrotreating reactor" may also be referred to as a "slurry hydrotreating reactor."

Now referring to FIGS. 1 and 2, the moving bed hydrotreating reactor 12 hydrotreats a hydrocarbon oil stream 26 and a hydrogen stream 24 with a hydrotreating catalyst to form a hydrocarbon product stream 28 and spent hydrotreating catalyst 34. In embodiments, the hydrocarbon product stream 28 may include the hydrocarbon oil stream 26 and the hydrogen stream 24. In embodiments, the hydrocarbon oil stream 26 and the hydrogen stream 24 may be mixed before entering the moving bed hydrotreating reactor 12.

In embodiments, the hydrotreating catalyst may be pre-loaded into the moving-bed hydrotreating reactor 12. The hydrotreating catalyst may include an active-phase metal on a support. The active-phase metal may include nickel, molybdenum, tungsten, platinum, palladium, rhodium, ruthenium, gold, or combinations thereof. In embodiments, the support may include amorphous alumina, crystalline silica-alumina, alumina, silica, and combinations thereof. The hydrotreating catalyst may include MoNi on $Al_2O_3$, MoCO on $Al_2O_3$, $MoS_2$, maghemite, $Fe_3O_4$, nickel, NiO, $TiO_2$, $ZrO_2$, $CeO_2$, or combinations thereof. The hydrotreating catalyst may become spent hydrotreating catalyst 34 when coke produced as a byproduct of the hydrotreating reaction is deposited on the hydrotreating catalyst, thereby rendering the hydrotreating catalyst at least partially ineffective. The hydrotreating catalyst may also become spent hydrotreating catalyst 34 when at least part of the hydrocarbon oil stream 26 is adsorbed onto the hydrotreating catalyst, thereby rendering the hydrotreating catalyst at least partially ineffective.

In embodiments, the moving-bed hydrotreating reactor 12 may have a temperature of from 370° C. to 500° C. The moving-bed hydrotreating reactor 12 may have a temperature of from 370° C. to 500° C., from 370° C. to 480° C., from 370° C. to 450° C., from 370° C. to 420° C., from 370° C. to 400° C., from 370° C. to 390° C., from 370° C. to 380° C., from 380° C. to 500° C., from 380° C. to 480° C., from 380° C. to 450° C., from 380° C. to 420° C., from 380° C. to 400° C., from 380° C. to 390° C., from 390° C. to 500° C., from 390° C. to 480° C., from 390° C. to 450° C., from 390° C. to 420° C., from 390° C. to 400° C., from 400° C. to 500° C., from 400° C. to 480° C., from 400° C. to 450° C., from 400° C. to 420° C., from 420° C. to 500° C., from 420° C. to 480° C., from 420° C. to 450° C., 450° C. to 500° C., from 450° C. to 480° C., or from 480° C. to 500° C.

In embodiments, the moving-bed hydrotreating reactor 12 may have a pressure of from 12 MPa to 16 MPa. The moving-bed hydrotreating reactor 12 may have a pressure of from 12 MPa to 16 MPa, from 12 MPa to 15.5 MPa, from 12 MPa to 15 MPa, from 12 MPa to 14.5 MPa, from 12 MPa to 14 MPa, from 12 MPa to 13.5 MPa, from 12 MPa to 13 MPa, from 12 MPa to 12.5 MPa, from 12.5 MPa to 16 MPa, from 12.5 MPa to 15.5 MPa, from 12.5 MPa to 15 MPa, from 12.5 MPa to 14.5 MPa, from 12.5 MPa to 14 MPa, from 12.5 MPa to 13.5 MPa, from 12.5 MPa to 13 MPa, from 13 MPa to 16 MPa, from 13 MPa to 15.5 MPa, from 13 MPa to 15 MPa, from 13 MPa to 14.5 MPa, from 13 MPa to 14 MPa, from 13 MPa to 13.5 MPa, from 13.5 MPa to 16 MPa, from 13.5 MPa to 15.5 MPa, from 13.5 MPa to 15 MPa, from 13.5 MPa to 14.5 MPa, from 13.5 MPa to 14 MPa, from 14 MPa to 16 MPa, from 14 MPa to 15.5 MPa, from 14 MPa to 15 MPa, from 14 MPa to 14.5 MPa, from 14.5 MPa to 16 MPa, from 14.5 MPa to 15.5 MPa, from 14.5 MPa to 15 MPa, from 15 MPa to 16 MPa, from 15 MPa to 15.5 MPa, or from 15.5 MPa to 16 MPa.

In embodiments, the moving-bed hydrotreating reactor 12 may have a liquid hourly space velocity of from $0.2\ h^{-1}$ to $0.7\ h^{-1}$. The moving-bed hydrotreating reactor 12 may have a liquid hourly space velocity of from $0.2\ h^{-1}$ to $0.7\ h^{-1}$, from $0.2\ h^{-1}$ to $0.6\ h^{-1}$, from $0.2\ h^{-1}$ to $0.5\ h^{-1}$, from $0.2\ h^{-1}$ to $0.4\ h^{-1}$, from $0.2\ h^{-1}$ to $0.3\ h^{-1}$, from $0.3\ h^{-1}$ to $0.7\ h^{-1}$, from $0.3\ h^{-1}$ to $0.6\ h^{-1}$, from $0.3\ h^{-1}$ to $0.5\ h^{-1}$, from $0.3\ h^{-1}$ to $0.4\ h^{-1}$, from $0.4\ h^{-1}$ to $0.7\ h^{-1}$, from $0.4\ h^{-1}$ to $0.6\ h^{-1}$, from $0.4\ h^{-1}$ to $0.5\ h^{-1}$, from $0.5\ h^{-1}$ to $0.7\ h^{-1}$, from $0.5\ h^{-1}$ to $0.6\ h^{-1}$, or from $0.6\ h^{-1}$ to $0.7\ h^{-1}$.

Still referring to FIGS. 1 and 2, and in embodiments, the moving-bed hydrotreating reactor 12 may have a ratio of hydrogen 24 to hydrocarbon oil stream 26 of from 800 L/L to 1200 L/L. The moving-bed hydrotreating reactor 12 may have a ratio of hydrogen 24 to hydrocarbon oil stream 26 of from 800 L/L to 1200 L/L, from 800 L/L to 1100 L/L, from 800 L/L to 1000 L/L, from 800 L/L to 900 L/L, from 900 L/L to 1200 L/L, from 900 L/L to 1100 L/L, from 900 L/L to 1000 L/L, from 1000 L/L to 1200 L/L, from 1000 L/L to 1100 L/L, from 1100 L/L to 1200 L/L, or from 1100 L/L to 1200 L/L.

Referring again to FIG. 1, and as previously mentioned, the moving-bed hydrotreating reactor 12 may be the ebullated-bed hydrotreating reactor. As described herein, "ebullated-bed reactors" are a type of fluidized bed reactor that utilizes ebullition, or bubbling, to achieve distribution of reactants and catalysts. Catalysts in the ebullated-bed reactor may remain suspended and held in a fluidized state through the upward lift of liquid reactant and gas. In one non-limiting example, the hydrogen 24 and hydrocarbon oil stream 26 may suspend the hydrotreating catalyst as a fluidized bed within the ebullated-bed hydrotreating reactor.

In embodiments including the ebullated-bed hydrotreating reactor, the hydrocarbon oil stream 26 may exit at the top of the moving-bed hydrotreating reactor 12. The spent hydrotreating catalyst 34 may exit at the bottom of the moving-bed hydrotreating reactor 12 after settling from the ebullated-bed. Additionally or alternatively, the spent hydrotreating catalyst 34 and at least some of the hydrotreating catalyst may be regularly withdrawn from the ebullated-bed hydrotreating reactor to control the level of catalyst activity. Fresh hydrotreating catalyst 44, a regenerated hydrotreating catalyst 40, or both may then be added on the top of the ebullated-bed to maintain constant catalyst activity. In one non-limiting example, 10% of the hydrotreating catalyst and spent hydrotreating catalyst 34 may be removed every 3 to 5 days and replaced.

Still referring to FIG. 1, and in embodiments, the hydrotreating catalyst may have an average particle size of from 500 μm to 1000 μm. The hydrotreating catalyst may have an average particle size of from 400 μm to 1100 μm, from 400 μm to 1000 μm, from 400 μm to 900 μm, from 400 μm to 800 μm, from 400 μm to 700 μm, from 400 μm to 600 μm, from 400 μm to 500 μm, from 500 μm to 1100 μm, from 500 μm to 1000 μm, from 500 μm to 900 μm, from 500 μm to 800 μm, from 500 μm to 700 μm, from 500 μm to 600 μm, from 600 μm to 1100 μm, from 600 μm to 1000 μm, from 600 μm to 900 μm, from 600 μm to 800 μm, from 600 μm to 700 μm, from 700 μm to 1100 μm, from 700 μm to 1000 μm, from 700 μm to 900 μm, from 700 μm to 800 μm, from 800 μm to 1100 μm, from 800 μm to 1000 μm, from 800 μm to 900 μm, from 900 μm to 1100 μm, from 900 μm to 1000 μm, and from 1000 μm to 1100 μm.

Referring again to FIG. 2, and as previously mentioned, the moving-bed hydrotreating reactor 12 may be the slurry-bed hydrotreating reactor. As described herein, "slurry-bed reactors" or "slurry reactors" are another type of fluidized bed reactor that suspends solid catalyst in a liquid reactant. Catalysts in the slurry-bed reactor may remain suspended and held in a fluidized state through the upward lift of the liquid reactant. After the liquid reactant is treated, the catalyst and liquid reactant may exit the slurry-bed hydrotreating reactor together, where they may be later separated. In one non-limiting example, the hydrocarbon oil stream 26 may suspend the hydrotreating catalyst within the slurry-bed hydrotreating reactor while the hydrocarbon oil stream 26 is hydrotreated. In embodiments including the slurry-bed hydrotreating reactor, the hydrogen stream 24, the hydrocarbon oil stream 26, the spent hydrotreating catalyst 34, or combinations thereof may exit at the top of the moving-bed hydrotreating reactor 12.

It is contemplated that the hydrotreating catalyst used for the slurry-bed hydrotreating reactor will have a smaller average particle size than the hydrotreating catalysts used for the ebullated-bed hydrotreating reactor. It is further contemplated that the smaller average particle size is preferred because smaller catalyst particles may more easily pass through the various pumps and lines the catalyst particles encounter without plugging. Additionally, smaller catalyst particles may improve the catalyst efficiency and reaction performance of hydrotreating reactors due to a greater effective surface area for the particles. It is contemplated that the greater efficiency and reaction performance of the smaller particles may compensate for a shorter catalyst contact time in the slurry-bed hydrotreating reactor as compared to either the fixed-bed or ebullated-bed hydrotreating reactors.

In embodiments, the hydrotreating catalyst may have an average particle size of from 0.01 μm to 10 μm. The hydrotreating catalyst may have an average particle size of from 0.01 μm to 10 μm, from 0.01 μm to 8 μm, 0.01 μm to 6 μm, 0.01 μm to 4 μm, 0.01 μm to 2 μm, 0.01 μm to 1 μm, 0.01 μm to 0.1 μm, 0.1 μm to 10 μm, from 0.1 μm to 8 μm, 0.1 μm to 6 μm, 0.1 μm to 4 μm, 0.1 μm to 2 μm, 0.1 μm to 1 μm, 1 μm to 10 μm, from 1 μm to 8 μm, 1 μm to 6 μm, 1 μm to 4 μm, 1 μm to 2 μm, 2 μm to 10 μm, from 2 μm to 8 μm, 2 μm to 6 μm, 2 μm to 4 μm, 4 μm to 10 μm, from 4 μm to 8 μm, 4 μm to 6 μm, 6 μm to 10 μm, from 6 μm to 8 μm, or from 8 μm to 10 μm.

Referring again to FIGS. 1 and 2, and in embodiments, fixed-bed reactors are not preferred in the integrated systems 10 and 60 because hydrotreating catalyst cannot be recycled continuously from the fixed-bed to maintain a constant catalyst activity within the moving-bed hydrotreating reactor 12. To replace hydrotreating catalyst within the fixed-bed reactor, the fixed-bed reactor must be shut down. Consequently, as catalyst activity decreases, operating temperatures of the fixed-bed reactor must increase to maintain a desired conversation rate of >540° C. boiling point hydrocarbon fractions to <180° C. boiling point hydrocarbon fractions. The desired conversation rate may also include producing the hydrocarbon product stream 28 with less than 10 ppm nitrogen content. Catalyst deactivation rates for a fixed-bed reactor may necessitate increasing the operating temperature of the fixed-bed reactor from 0.5° C. to 1° C. per day to maintain the desired conversion rates.

As operating temperatures in the fixed-bed reactor increase, particularly as operating temperatures approach and exceed 400° C., it is contemplated that more of the reactions within the moving-bed hydrotreating reactor 12 move to thermal cracking. As a result, more methane and coking on the hydrotreating catalysts are produced, increasing the hydrotreating catalyst deactivation rate. It is contemplated that the increased generation of methane in the fixed-bed reactor may negatively impacts yields that could be generated from steam cracking further downstream, as methane is inert in steam cracking. Further, it is contemplated that approximately 5 wt. % less of >540° C. boiling point hydrocarbon fractions, as compared to the embodiments described herein, may be converted to <180° C. boiling point hydrocarbon fractions in the fixed-bed reactor due to the previously discussed reasons.

As operating temperatures in the fixed-bed reactor increase further, particularly as operating temperatures approach and exceed 440° C., it is contemplated that the fixed-bed reactor will need to be shut down to replace the hydrotreating catalysts. Continued operation of the fixed-bed reactor at these temperatures may result in undesirable loss of hydrotreating products to thermal cracking. In embodiments, using ebullated-bed hydrotreating reactors or slurry-bed hydrotreating reactors instead of fixed-bed reactors may maintain the desired conversion rates for 3 to 5 years before the reactors needs to be stopped to replace all of the used hydrotreating catalyst with new hydrotreating catalyst. In comparison, using fixed-bed reactors may maintain the desired conversion rates for 1 to 12 months before the fixed-bed system needs to be stopped to replace all of the used hydrotreating catalyst with the new hydrotreating catalyst. In embodiments, using ebullated-bed hydrotreating reactors or slurry-bed hydrotreating reactors instead of fixed-bed reactors may also allow operating temperatures to be maintained below 440° C. or below 400° C., which in turn may reduce the amount of reactions within the moving-bed hydrotreater 12 that move to thermal cracking.

Still referring to FIGS. 1 and 2, and in embodiments, the hydrocarbon oil stream 26 may include whole crude oil, topped crude oil, or a combination thereof. Whole crude oil may include crude oil as previously described. As described herein, "topped crude oil" is understood to mean a fraction of crude oil with boiling points less than 160° C.

While the present description and examples may specify whole crude oil as the hydrocarbon oil stream 26, it should be understood that the systems 10 and 60, described with respect to the embodiments of FIGS. 1 and 2, may be applicable for the conversion of a wide variety of crude oils, which may be present in the hydrocarbon oil stream 26. The hydrocarbon oil stream 26 may include one or more non-hydrocarbon constituents, such as one or more heavy metals, sulfur compounds, nitrogen compounds, inorganic components, or other non-hydrocarbon compounds.

In embodiments, the hydrocarbon oil stream 26 may be a light crude oil, which includes crude oil having an American Petroleum Institute (API) gravity of greater than 35°, 36°, 37°, or 38°. In these embodiments, the light crude oil may also be categorized as a sour light crude oil, which includes crude oil having a sulfur content of less than 1.5 weight percent (wt. %), based on the total weight of the crude oil, such as less than or equal to 1.4 wt. %, 1.3 wt. %, 1.2 wt. %, 1.1 wt. %, or 1.0 wt. %. By way of non-limiting example, the hydrocarbon oil stream 26 may be Arab Light crude oil, which has an API gravity of approximately 330 and a sulfur content of approximately 1.77 wt. %. By way of another non-limiting example, the hydrocarbon oil stream 26 may be Arab Extra Light crude oil, which has an API gravity of approximately 390 and a sulfur content of approximately 1.1 wt. %. In embodiments, the hydrocarbon oil stream 26 may be a combination of crude oils, such as, for example, a combination of Arab Light crude oil and Arab Extra Light crude oil. It should be understood that, as used herein, the "hydrocarbon oil stream" may refer to crude oil, which has not been previously treated, separated, or otherwise refined.

In embodiments, the hydrocarbon oil stream 26 may have a density lower than 0.89 g/mL. In embodiments, the hydrocarbon oil stream 26 may have a density of from 0.75 g/mL to 0.92 g/mL, from 0.75 g/mL to 0.89 g/mL, from 0.75 g/mL to 0.87 g/mL, from 0.75 g/mL to 0.84 g/mL, from 0.84 g/mL to 0.92 g/mL, from 0.84 g/mL to 0.89 g/mL, from 0.84 g/mL to 0.87 g/mL, from 0.87 g/mL to 0.92 g/mL, from 0.87 g/mL to 0.89 g/mL, or from 0.89 g/mL to 0.92 g/mL In embodiments, the hydrocarbon oil stream 26 may have 9.7 wt. %>540° C. boiling point hydrocarbon fractions. The hydrocarbon oil stream 26 may have 14.6 wt. %>540° C. boiling point hydrocarbon fractions. In embodiments, the hydrocarbon oil stream 26 may have from 1 wt. % to 20 wt. %, from 1 wt. % to 16 wt. %, from 1 wt. % to 14 wt. %, from 1 wt. % to 10 wt. % from 1 wt. % to 8 wt. %, from 1 wt. % to 4 wt. %, from 4 wt. % to 20 wt. %, from 4 wt. % to 16 wt. %, from 4 wt. % to 14 wt. %, from 4 wt. % to 10 wt. %, from 4 wt. % to 8 wt. %, from 8 wt. % to 20 wt. %, from 8 wt. % to 16 wt. %, from 8 wt. % to 14 wt. %, from 8 wt. % to 10 wt. %, from 10 wt. % to 20 wt. %, from 10 wt. % to 16 wt. %, from 10 wt. % to 14 wt. %, from 14 wt. % to 20 wt. %, from 14 wt. % to 16 wt. %, or from 16 wt. % to 20 wt. %>540° C. boiling point hydrocarbon fractions.

In embodiments, the hydrocarbon oil stream 26 may have a nitrogen content of 844 ppm nitrogen. The hydrocarbon oil stream 26 may have a nitrogen content of 404 ppm nitrogen. In embodiments, the hydrocarbon oil stream 26 may have a nitrogen content of from 1 to 900 ppm, from 1 to 700 ppm, from 1 to 500 ppm, from 1 to 300 ppm, from 1 to 100 ppm, from 1 to 20 ppm, from 20 to 900 ppm, from 20 to 700 ppm, from 20 to 500 ppm, from 20 to 300 ppm, from 20 to 100 ppm, from 100 to 900 ppm, from 100 to 700 ppm, from 100 to 500 ppm, from 100 to 300 ppm, from 300 to 900 ppm, from 300 to 700 ppm, from 300 to 500 ppm, from 500 to 900 ppm, from 500 to 700 ppm, or from 700 to 900 ppm nitrogen.

Still referring to FIGS. 1 and 2, and in embodiments, the hydrocarbon product stream 28 may be mixed with a second hydrogen stream 30 to form a resulting mixture 32. The hydrocracking reactor may crack the hydrocarbon product stream 28, the second hydrogen stream 30, or the resulting mixture 32 with a hydrocracking catalyst to form a hydrocracked hydrocarbon product stream 48. In embodiments, the hydrocracking reactor 14 may also form a spent hydrocracking catalyst. As shown in FIG. 1, the hydrocracking reactor 14 may be fluidly connected to the moving-bed hydrotreating reactor 12. The hydrocracking catalyst may be pre-loaded into the hydrocracking reactor 14. In embodiments, the hydrocracking catalyst may include an active metal and a support. The active metal may include NiMo, NiW, or combinations thereof. The support may include nano-sized zeolite, hierarchical zeolite, or combinations thereof.

In embodiments, the hydrocracking reactor 14 may have a temperature of from 350° C. to 440° C. The hydrocracking reactor 14 may have a temperature of from 350° C. to 440° C., from 350° C. to 420° C., from 350° C. to 390° C., from 350° C. to 370° C., from 370° C. to 440° C., from 370° C. to 420° C., from 370° C. to 390° C., from 390° C. to 440° C., from 390° C. to 420° C., or from 420° C. to 440° C.

In embodiments, the hydrocracking reactor 14 may have a pressure of from 13 MPa to 16 MPa. The hydrocracking reactor 14 may have a pressure of from 13 MPa to 16 MPa, from 13 MPa to 15.5 MPa, from 13 MPa to 15 MPa, from 13 MPa to 14.5 MPa, from 13 MPa to 14 MPa, from 13 MPa to 13.5 MPa, from 13.5 MPa to 16 MPa, from 13.5 MPa to 15.5 MPa, from 13.5 MPa to 15 MPa, from 13.5 MPa to 14.5 MPa, from 13.5 MPa to 14 MPa, from 14 MPa to 16 MPa, from 14 MPa to 15.5 MPa, from 14 MPa to 15 MPa, from 14 MPa to 14.5 MPa, from 14.5 MPa to 16 MPa, from 14.5 MPa to 15.5 MPa, from 14.5 MPa to 15 MPa, from 15 MPa to 16 MPa, from 15 MPa to 15.5 MPa, or from 15.5 MPa to 16 MPa.

In embodiments, the hydrocracking reactor 14 may have a liquid hourly space velocity of from $0.5\ h^{-1}$ to $1.5\ h^{-1}$. The hydrocracking reactor 14 may have a liquid hourly space velocity of from $0.5\ h^{-1}$ to $1.5\ h^{-1}$, from $0.5\ h^{-1}$ to $1.3\ h^{-1}$, from $0.5\ h^{-1}$ to $1.1\ h^{-1}$, from $0.5\ h^{-1}$ to $0.9\ h^{-1}$, from $0.5\ h^{-1}$ to $0.7\ h^{-1}$, from $0.7\ h^{-1}$ to $1.5\ h^{-1}$, from $0.7\ h^{-1}$ to $1.3\ h^{-1}$, from $0.7\ h^{-1}$ to $1.1\ h^{-1}$, from $0.7\ h^{-1}$ to $0.9\ h^{-1}$, from $0.9\ h^{-1}$ to $1.5\ h^{-1}$, from $0.9\ h^{-1}$ to $1.3\ h^{-1}$, from $0.9\ h^{-1}$ to $1.1\ h^{-1}$, from $1.1\ h^{-1}$ to $1.5\ h^{-1}$, from $1.1\ h^{-1}$ to $1.3\ h^{-1}$, or from $1.3\ h^{-1}$ to $1.5\ h^{-1}$.

In embodiments, the hydrocracking reactor 14 may have a ratio of the second hydrogen stream 30 to the hydrocarbon product stream 28 of from 1000 L/L to 2000 L/L. The hydrocracking reactor may have a ratio of the second hydrogen stream 30 to the hydrocarbon product stream 28 of from 1000 L/L to 1800 L/L, from 1000 L/L to 1600 L/L, from 1000 L/L to 1400 L/L, from 1000 L/L to 1200 L/L, from 1200 L/L to 1800 L/L, from 1200 L/L to 1600 L/L, from 1200 L/L to 1400 L/L, from 1400 L/L to 1800 L/L, from 1400 L/L to 1600 L/L, or from 1600 L/L to 1800 L/L.

Referring again to FIG. 2, and in embodiments, the integrated system 60 may additionally include a catalyst separator 62. The catalyst separator 62 may be an oil-catalyst separator or a combination gas-oil-catalyst separator. The catalyst separator 62 may be fluidly connected to the moving-bed hydrotreating reactor 12, the stripper 20, and the hydrocracking reactor 14. The catalyst separator 62 may separate the hydrocarbon product stream 28 from the spent hydrotreating catalyst 34.

Still referring to FIGS. 1 and 2, and in embodiments, the integrated systems 10 and 60 may include a separator 18. The separator 18 may be a gas-liquid separation unit. The separator 18 may be fluidly connected to the hydrocracking reactor 14. The separator 18 may separate the hydrocracked hydrocarbon product stream 48 into a light fraction stream 50 and a heavy hydrocarbon fraction stream 52. The light fraction stream 50 may include $C_1$-$C_4$ hydrocarbons, hydrogen sulfide, hydrogen, ammonia, or combinations thereof. The heavy hydrocarbon fraction stream 52 may include $C_{5+}$ hydrocarbons.

In embodiments, the integrated systems 10 and 60 may include a scrubbing unit fluidly connected to the hydrocracking reactor 14. The scrubbing unit may separate the $C_1$-$C_4$ hydrocarbons and hydrogen from the hydrogen sulfide and ammonia. The integrated systems 10 and 60 may also include a pressure swing adsorption (PSA) unit fluidly connected to the scrubbing unit. The PSA unit may separate the hydrogen from the $C_1$-$C_4$ hydrocarbons to form recycled hydrogen. In embodiments, the PSA unit may also send the recycled hydrogen to be recycled in the integrated systems 10 and 60 as the hydrogen stream 24 or the second hydrogen stream 30. (not shown)

The integrated systems 10 and 60 may also include a methane cracking unit fluidly connected to the scrubbing unit. The methane cracking unit may crack the $C_1$-$C_4$ hydrocarbons and separate methane from $C_2$-$C_4$ hydrocarbons. The integrated systems 10 and 60 may also include a steam cracking unit fluidly connected to the separator 18 and scrubbing unit. The steam cracking unit may steam crack the $C_2$-$C_4$ hydrocarbons and the $C_{5+}$ hydrocarbons to form steam cracked $C_2$-$C_{5+}$ hydrocarbons. The integrated systems 10 and 60 may also include an aromatization process unit fluidly connected to the steam cracking unit. The aromatization process unit may separate aromatic hydrocarbons from the steam cracked $C_2$-$C_{5+}$ hydrocarbons. (not shown)

Still referring to FIGS. 1 and 2, and as stated previously, the integrated systems 10 and 60 include a catalyst reclamation unit 16. The catalyst reclamation unit 16 includes a stripper 20 and a catalyst regenerator 22. The stripper 20 strips the spent hydrotreating catalyst 34 to form a stripped spent catalyst 38. In embodiments, the stripper 20 may be a steam stripper. The steam stripper may strip the spent hydrotreating catalyst 34 with steam 36. The steam may remove adsorbed oil from the spent hydrotreating catalyst 34. In embodiments, and as shown in FIG. 1, the stripper 20 may be fluidly connected to the hydrocracking reactor 14. As shown in FIG. 2, the stripper 20 may be fluidly connected to the catalyst separator 62.

Still referring to FIGS. 1 and 2, the catalyst regenerator 22 regenerates the stripped hydrotreating catalyst 38 to form a regenerated hydrotreating catalyst 40. The catalyst regenerator 22 is fluidly connected to the stripper 20. The catalyst regenerator 22 may regenerate the stripped hydrotreating catalyst 38 by burning the deposited coke on the stripped hydrotreating catalyst 38 with a high temperature treatment, for example, heated air. The catalyst regenerator 22 and the heated air may have a temperature of from 500° C. to 700° C. The catalyst regenerator 22 and the heated air may have a temperature of from 500° C. to 700° C., from 500° C. to 650° C., from 500° C. to 600° C., from 500° C. to 550° C., from 550° C. to 700° C., from 550° C. to 650° C., from 550° C. to 600° C., from 600° C. to 700° C., from 600° C. to 650° C., or from 650° C. to 700° C.

In embodiments, the regenerated hydrotreating catalyst 40 may be mixed with fresh hydrotreating catalyst 44 to produce a catalyst mixture 46. In embodiments, the catalyst mixture 46 may have a ratio of from 20:1 to 1:20 regenerated hydrotreating catalyst 40 to fresh hydrotreating catalyst 44. The catalyst mixture 46 may have a ratio of from 20:1, from 16:1, from 12:1, from 8:1, from 4:1, from 1:1, from 1:4, from 1:8, from 1:12, from 1:16, or from 1:20 regenerated hydrotreating catalyst 40 to fresh hydrotreating catalyst 44.

Referring again to FIG. 1, and in embodiments, the catalyst regenerator 22 may be fluidly connected to the moving-bed hydrotreating reactor 12. The regenerated hydrotreating catalyst 40 or catalyst mixture 46 may be recycled into the moving-bed hydrotreating reactor 12. The regenerated hydrotreating catalyst 40 or catalyst mixture 46 may then be reused as the hydrotreating catalyst. By way of non-limiting example, the regenerated hydrotreating catalyst

40 or catalyst mixture 46 may be recycled into the moving-bed hydrotreating reactor 12 by adding it to an ebullated-bed of the ebullated-bed hydrotreating reactor or adding it to a slurry of the slurry-bed hydrotreating reactor.

Referring again to FIG. 2, and in embodiments, the catalyst reclamation unit 16 may additionally include a presulfiding unit 64. The presulfiding unit 64 may be fluidly connected to the catalyst regenerator 22 and the moving-bed hydrotreating reactor 12. The presulfiding unit 64 may presulfide the regenerated hydrotreating catalyst 40 or the catalyst mixture 46 to form a presulfided hydrotreating catalyst 66. The presulfided hydrotreating catalyst 66 may then be recycled into the moving-bed hydrotreating reactor 12 to be reused and recycled as the hydrotreating catalyst.

Referring again to FIGS. 1 and 2, and in embodiments, at least part of the spent hydrotreating catalyst 34, the stripped spent catalyst 38, the regenerated hydrotreating catalyst 40, the presulfided hydrotreating catalyst 66, or combinations thereof may be removed from the integrated systems 10 and 60 as waste catalyst 42 for proper disposal. Waste catalyst 42 may be removed when the waste catalyst 42 is no longer effective as a hydrotreating catalyst even after being stripped, regenerated, presulfided, or combinations thereof.

Still referring to FIGS. 1 and 2, embodiments of the present disclosure also include integrated hydrotreating and hydrocracking processes. The processes may include any of the integrated systems 10 and 60 previously described. The process includes contacting the hydrocarbon oil stream 26 with the hydrogen stream 24 and the hydrotreating catalyst in the moving-bed hydrotreating reactor 12, thereby producing the hydrocarbon product stream 28 and the spent hydrotreating catalyst 34. The process further includes contacting the hydrocarbon product stream 28 with the second hydrogen stream 30 and the hydrocracking catalyst in the hydrocracking reactor 14, thereby producing the hydrocracked hydrocarbon product stream 48. In embodiments, and as previously mentioned, the hydrocracking reactor 14 may also produce the spent hydrocracking catalyst. The method further includes processing the spent hydrotreating catalyst 34 to produce regenerated hydrotreating catalyst 40. The method further includes recycling the regenerated hydrotreating catalyst 40 to the moving-bed hydrotreating reactor 12.

In embodiments, the method may further include separating the hydrocarbon product stream 28 from the spent hydrotreating catalyst 34. Processing the spent hydrotreating catalyst 34 to produce regenerated hydrotreating catalyst 40 may include stripping the spent hydrotreating catalyst 34 and regenerating the spent hydrotreating catalyst 34. Stripping may occur in the stripper 20 with steam 36, as previously described. Regenerating may occur in the catalyst regenerator 22, as previously described. In embodiments, stripping and regenerating the spent hydrotreating catalyst 34 may at least partially remove coke deposited on the spent hydrotreating catalyst 34, thereby producing the regenerated hydrotreating catalyst 40.

Still referring to FIGS. 1 and 2, and in embodiments, the method may further include mixing the regenerated hydrotreating catalyst 40 with fresh hydrotreating catalyst 44 to produce the catalyst mixture 46. As illustrated in FIG. 2, the method may further include presulfiding the regenerated hydrotreating catalyst 40 or the catalyst mixture 46 to produce the presulfided hydrotreating catalyst 66. Presulfiding may occur in the presulfiding unit 64, as previously described. The method may then further include recycling the presulfided hydrotreating catalyst 66 to the moving-bed hydrotreating reactor 12.

In embodiments, the method may further include sending the hydrocracked hydrocarbon product stream 48 to the separator 18. The method may then further include allowing the separator 18 to separate the hydrocracked hydrocarbon product stream 48 into the light fraction stream 50 and the heavy hydrocarbon fraction stream 52. The method may then further include sending the light fraction stream 50, the heavy hydrocarbon fraction stream 52, or both to the scrubbing unit, the PSA unit, the methane cracking unit, the steam cracking unit, the aromatization process unit, or combinations thereof, as previously described in systems 10 and 60. (not shown.)

EXAMPLES

The various embodiments of methods and systems for the conversion of a hydrocarbon oil will be further clarified by the following examples. The examples are illustrative in nature, and should not be understood to limit the subject matter of the present disclosure.

Example 1

Arab light crude oil (AL) and Arab extra light crude oil (AXL) were processed in a pilot plant using the systems depicted in FIGS. 1 and 2. The compositions of the Arab light crude oil and the Arab extra light crude oil used in the Examples are shown below in Table 1. The hydrotreating catalyst used in the examples was MoNi on $Al_2O_3$, particularly, 15 wt. % $MoO_3$ and 5 wt. % NiO by weight of the total hydrotreating catalyst. The hydrocracking catalyst used was Mo—Ni on mesoporous zeolite Y, particularly, 15 wt. % $MoO_3$ and 5 wt. % NiO by weight of the total hydrocracking catalyst. The mesoporous zeolite Y was commercialized CBV-760 obtained from Zeolyst™.

TABLE 1

| Arab Light and Arab Extra Light Crude Oil Compositions | | |
|---|---|---|
| Feed | AXL | AL |
| Density at 15.6° C. | 0.8412 | 0.8658 |
| Sulfur content, wt % | 0.639 | 1.803 |
| Nitrogen content, ppm | 404 | 844.1 |
| Percentage <540° C. boiling point hydrocarbon fractions | 90.3 | 85.4 |
| Percentage >540° C. boiling point hydrocarbon fractions | 9.7 | 14.6 |

Table 2 below illustrates the pilot plant testing results using Arab extra light crude oil as the feedstock. Performance was measured over 3-5 days to determine the initial deactivation rate of the catalysts and then extrapolated to determine when the hydrotreating catalyst would need to be replaced. Inventive Examples 1 and 2 were performed using a moving-bed hydrotreating reactor. Comparative Examples 1 and 2 were performed using a fixed-bed reactor. Inventive Example 1 and Comparative Example 1 did not include a hydrocracking reactor or hydrocracking catalysts. Inventive Example 2 and Comparative Example 2 did include a hydrocracking reactor and a hydrocracking catalyst.

TABLE 2

Inventive Example Testing with Arab Extra Light Crude

| Example # | Inventive Example 1 | Inventive Example 2 | Comparative Example 1 | Comparative Example 2 |
|---|---|---|---|---|
| Resulting Density (g/mL) | 0.7989 | 0.7562 | 0.8175 | 0.8077 |
| Sulfur Content (ppm) | 28 | 20 | 55 | 100 |
| Nitrogen Content (ppm) | 1 | <1.0 | 16 | 22 |
| Percentage <180° C. boiling point hydrocarbon fractions | 40 | 90 | 40 | 60 |
| Percentage >540° C. boiling point hydrocarbon fractions | 0.7 | 0 | 2.8 | 3.1 |

Compared to Comparative Examples 1 and 2, which included a fixed-bed reactor, the Inventive Examples resulted in a lower nitrogen content and greater conversation of >540° C. boiling point hydrocarbon fractions to <180° C. boiling point hydrocarbon fractions. After adding in the hydrocracking reactor in Inventive Example 2, the conversation rate became even more significant with the >540° C. boiling point hydrocarbon fractions completely converted.

Table 3 below illustrates the pilot plant testing results using Arab light crude oil as the feedstock. Performance was measured over 3-5 days to determine the initial deactivation rate of the catalysts and then extrapolated to determine when the hydrotreating catalyst would need to be replaced. Inventive Examples 3 and 4 were performed using the moving-bed hydrotreating reactor. Comparative Examples 3 and 4 were performed using the fixed-bed reactor. Inventive Example 3 and Comparative Example 3 did not include a hydrocracking reactor or hydrocracking catalysts. Inventive Example 4 and Comparative Example 4 did include a hydrocracking reactor and a hydrocracking catalyst.

TABLE 3

Inventive Example Results with Arab Light Crude

| Example # | Inventive Example 3 | Inventive Example 4 | Comparative Example 3 | Comparative Example 4 |
|---|---|---|---|---|
| Resulting Density (g/mL) | 0.8161 | 0.7666 | 0.8148 | 0.8192 |
| Sulfur Content (ppm) | 2 | 6.2 | 15 | 4 |
| Nitrogen Content (ppm) | <1.0 | <1.0 | <1.0 | <1.0 |
| Percentage <180° C. boiling point hydrocarbon fractions | 30 | 60 | 20 | 20 |
| Percentage >540° C. boiling point hydrocarbon fractions | 2.5 | 0 | 4.9 | 2.1 |

Similar to Table 2, the Inventive Examples resulted in a lower nitrogen content and greater conversation of >540° C. boiling point hydrocarbon fractions to <180° C. boiling point hydrocarbon fractions than the Comparative Examples. After adding in the hydrocracking reactor in Inventive Example 2, the conversation rate became even more significant, with the >540° C. boiling point hydrocarbon fractions completely converted.

Based on the observed catalyst deactivation rate when using Arab extra light crude oil, the run length for Comparative Examples 1 and 2 is approximately 6 to 12 months. For Arab light crude oil, the run length for Comparative Examples 3 and 4 is approximately less than 6 months. For the Inventive Examples 1-4, the run length is approximately 3 to 5 years. As discussed previously, run time is the amount of time the system can operate before all of the hydrotreating catalysts need to be replaced with new hydrotreating catalyst.

On average, the Inventive Examples resulted in naphtha yields increasing by 30 wt. % over the Comparative Examples. Additionally, the Inventive Examples resulted in diesel and vacuum gas oil yields of only 10 wt. % of the total hydrocarbon product. It is contemplated that the higher naphtha yields will increase olefin and aromatics yields in steam cracking. It is further contemplated that the higher naphtha yields will increase BTX yields as reforming feedstocks.

The present application discloses several technical aspects. One aspect is an integrated hydrotreating and hydrocracking process comprising contacting a hydrocarbon oil stream with a hydrogen stream and a hydrotreating catalyst in a moving-bed hydrotreating reactor, thereby producing a hydrocarbon product stream and a spent hydrotreating catalyst; contacting the hydrocarbon product stream with a second hydrogen stream and a hydrocracking catalyst in a hydrocracking reactor, thereby producing a hydrocracked hydrocarbon product stream; processing the spent hydrotreating catalyst to produce regenerated hydrotreating catalyst; and recycling the regenerated hydrotreating catalyst to the moving-bed hydrotreating reactor.

A second aspect includes any previous aspect, wherein the moving-bed hydrotreating reactor is an ebullated-bed hydrotreating reactor.

A third aspect includes any previous aspect, wherein the hydrotreating catalyst has an average particle size from 500 µm to 1000 µm.

A fourth aspect includes the first aspect, wherein the process further comprises separating the hydrocarbon product stream from the spent hydrotreating catalyst, and wherein the moving-bed hydrotreating reactor is a slurry-bed hydrotreating reactor.

A fifth aspect includes the fourth aspect, wherein the hydrotreating catalyst has an average particle size from 0.01 µm to 10 µm.

A sixth aspect includes any previous aspect, wherein processing the spent hydrotreating catalyst comprises stripping the spent hydrotreating catalyst; and regenerating the spent hydrotreating catalyst by thermal treatment, and wherein stripping and regenerating the spent hydrotreating catalyst at least partially removes coke deposited on the spent hydrotreating catalyst, thereby producing the regenerated hydrotreating catalyst.

A seventh aspect includes the sixth aspect, wherein the process further comprises mixing the regenerated hydrotreating catalyst with fresh hydrotreating catalyst to produce a catalyst mixture; presulfiding the catalyst mixture to produce a presulfided hydrotreating catalyst; and recycling the presulfided hydrotreating catalyst to the moving-bed hydrotreating reactor.

An eighth aspect includes any previous aspect, wherein the hydrocarbon oil stream comprises whole crude oil, topped crude oil, or both.

A ninth aspect includes any previous aspect, wherein the hydrotreating catalyst comprises MoNi on $Al_2O_3$, MoCO on $Al_2O_3$, $MoS_2$, maghemite, $Fe_3O_4$, nickel, NiO, $TiO_2$, $ZrO_2$, $CeO_2$, or combinations thereof.

A tenth aspect includes any previous aspect, wherein the hydrocracking catalyst comprises an active metal and a support, the active metal comprising NiMo, NiW, or a combination thereof, and the support comprising nano-sized zeolite, hierarchical zeolite, or a combination thereof.

An eleventh aspect includes any previous aspect, wherein the moving-bed hydrotreating reactor has a temperature from 370° C. to 500° C., a pressure from 12 MPa to 16 MPa, or both.

A twelfth aspect includes any previous aspect, wherein the moving-bed hydrotreating reactor has a liquid hourly space velocity from $0.2\ h^{-1}$ to $0.7\ h^{-1}$ and a ratio of hydrogen stream to hydrocarbon oil stream from 800 L/L to 1200 L/L.

A thirteenth aspect includes any previous aspect, wherein the hydrocracking reactor has a temperature from 350° C. to 440° C., a pressure from 13 MPa to 16 MPa, or both.

A fourteenth aspect includes any previous aspect, wherein the hydrocracking reactor has a liquid hourly space velocity from $0.5\ h^{-1}$ to $1.5\ h^{-1}$ and a ratio of hydrogen stream to the hydrocarbon product stream from 1000 L/L to 2000 L/L.

A fifteenth aspect includes a system for hydrotreating and hydrocracking a hydrocarbon oil stream, the system comprising a moving-bed hydrotreating reactor configured to hydrotreat the hydrocarbon oil stream and a hydrogen stream with a hydrotreating catalyst to form a hydrocarbon product stream and spent hydrotreating catalyst; a hydrocracking reactor fluidly connected to the moving-bed hydrotreating reactor and configured to crack the hydrocarbon product stream and a second hydrogen stream to form a hydrocracked hydrocarbon product stream; a stripper fluidly connected to the moving-bed hydrotreating reactor and configured to strip the spent hydrotreating catalyst to form a stripped hydrotreating catalyst; and a catalyst regenerator fluidly connected to the stripper and the moving-bed hydrotreating reactor and configured to regenerate the stripped hydrotreating catalyst to form a regenerated hydrotreating catalyst.

A sixteenth aspect includes the fifteenth aspect, wherein the moving-bed hydrotreating reactor is an ebullated-bed hydrotreating reactor; and the catalyst regenerator is configured to send the regenerated hydrotreating catalyst to the moving-bed hydrotreating reactor.

A seventeenth aspect includes the fifteenth aspect, wherein the system further comprises a catalyst separator fluidly connected to the moving-bed hydrotreating reactor, the hydrocracking reactor, and the stripper, wherein the moving-bed hydrotreating reactor is a slurry-bed hydrotreating reactor; and the catalyst separator is configured to separate the hydrocarbon product stream from the spent hydrotreating catalyst.

An eighteenth aspect includes the fifteenth through seventeenth aspects, wherein the system further comprises a presulfiding unit fluidly connected to the catalyst regenerator and the moving-bed hydrotreating reactor, wherein the presulfiding unit is configured to presulfide the regenerated hydrotreating catalyst to form a presulfided regenerated hydrotreating catalyst; and the presulfiding unit is configured to send the presulfided regenerated hydrotreating catalyst to the moving-bed hydrotreating reactor.

A nineteenth aspect includes the fifteenth through eighteenth aspects, wherein the hydrocarbon oil stream comprises whole crude oil, topped crude oil, or both.

A twentieth aspect includes the fifteenth aspect through nineteenth aspects, wherein the system further comprises a separator fluidly connected to the hydrocracking reactor and configured to separate the hydrocracked hydrocarbon product stream into a light fraction stream comprising $C_1$-$C_4$ hydrocarbons, hydrogen sulfide, hydrogen, ammonia, or combinations thereof and a heavy hydrocarbon fraction stream comprising $C_{5+}$ hydrocarbons; a scrubbing unit fluidly connected to the separator and configured to separate the $C_1$-$C_4$ hydrocarbons and hydrogen from the hydrogen sulfide and ammonia; a pressure swing adsorption (PSA) unit fluidly connected to the scrubbing unit and configured to separate the hydrogen from the $C_1$-$C_4$ hydrocarbons; a methane cracking unit fluidly connected to the scrubbing unit and configured to crack the $C_1$-$C_4$ hydrocarbons and separate methane from $C_2$-$C_4$ hydrocarbons; a steam cracking unit fluidly connected to the separator and methane cracking unit and configured to steam crack the $C_2$-$C_4$ hydrocarbons and the $C_{5+}$ hydrocarbons; and an aromatization process unit fluidly connected to the steam cracking unit and configured to separate aromatic hydrocarbons from the $C_2$-$C_{5+}$ hydrocarbons.

It is noted that recitations in the present disclosure of a component of the present disclosure being "operable" or "sufficient" in a particular way, to embody a particular property, or to function in a particular manner, are structural recitations, as opposed to recitations of intended use. More specifically, the references in the present disclosure to the manner in which a component is "operable" or "sufficient" denotes an existing physical condition of the component and, as such, is to be taken as a definite recitation of the structural characteristics of the component.

It is also noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

Having described the subject matter of the present disclosure in detail and by reference to specific embodiments, it is noted that the various details disclosed in the present disclosure should not be taken to imply that these details relate to elements that are essential components of the various embodiments described in the present disclosure. Further, it will be apparent that modifications and variations are possible without departing from the scope of the present disclosure, including, but not limited to, embodiments defined in the appended claims.

The singular forms "a", "an" and "the" include plural referents, unless the context clearly dictates otherwise.

Throughout this disclosure ranges are provided. It is envisioned that each discrete value encompassed by the ranges are also included. Additionally, the ranges which may be formed by each discrete value encompassed by the explicitly disclosed ranges are equally envisioned.

As used herein and in the appended claims, the words "comprise," "has," and "include" and all grammatical variations thereof are each intended to have an open, non-limiting meaning that does not exclude additional elements or steps.

As used herein, terms such as "first" and "second" are arbitrarily assigned and are merely intended to differentiate between two or more instances or components. It is to be understood that the words "first" and "second" serve no other purpose and are not part of the name or description of the component, nor do they necessarily define a relative location, position, or order of the component. Furthermore, it is to be understood that the mere use of the term "first" and "second" does not require that there be any "third" component, although that possibility is contemplated under the scope of the present disclosure.

What is claimed is:

1. An integrated hydrotreating and hydrocracking process comprising:
   contacting a hydrocarbon oil stream with a hydrogen stream and a hydrotreating catalyst in a moving-bed hydrotreating reactor to hydrotreat the hydrocarbon oil stream, thereby producing a hydrotreated hydrocarbon product stream and a spent hydrotreating catalyst;
   contacting the hydrotreated hydrocarbon product stream with a second hydrogen stream and a hydrocracking catalyst in a hydrocracking reactor to crack the hydrotreated hydrocarbon oil stream, thereby producing a hydrocracked hydrocarbon product stream;
   processing the spent hydrotreating catalyst to produce regenerated hydrotreating catalyst; and
   recycling the regenerated hydrotreating catalyst to the moving-bed hydrotreating reactor.

2. The integrated hydrotreating and hydrocracking process of claim 1, wherein the moving-bed hydrotreating reactor is an ebullated-bed hydrotreating reactor.

3. The integrated hydrotreating and hydrocracking process of claim 2, wherein the hydrotreating catalyst has an average particle size from 500 μm to 1000 μm.

4. The integrated hydrotreating and hydrocracking process of claim 1, further comprising:
   separating the hydrotreated hydrocarbon product stream from the spent hydrotreating catalyst, and wherein
   the moving-bed hydrotreating reactor is a slurry-bed hydrotreating reactor.

5. The integrated hydrotreating and hydrocracking process of claim 4, wherein the hydrotreating catalyst has an average particle size from 0.01 μm to 10 μm.

6. The integrated hydrotreating and hydrocracking process of claim 1, wherein processing the spent hydrotreating catalyst comprises:
   stripping the spent hydrotreating catalyst; and
   regenerating the spent hydrotreating catalyst by thermal treatment, and wherein
   stripping and regenerating the spent hydrotreating catalyst at least partially removes coke deposited on the spent hydrotreating catalyst, thereby producing the regenerated hydrotreating catalyst.

7. The integrated hydrotreating and hydrocracking process of claim 6, further comprising:
   mixing the regenerated hydrotreating catalyst with fresh hydrotreating catalyst to produce a catalyst mixture;
   presulfiding the catalyst mixture to produce a presulfided hydrotreating catalyst; and
   recycling the presulfided hydrotreating catalyst to the moving-bed hydrotreating reactor.

8. The integrated hydrotreating and hydrocracking process of claim 1, wherein the hydrocarbon oil stream comprises whole crude oil, topped crude oil, or both.

9. The integrated hydrotreating and hydrocracking process of claim 1, wherein the hydrotreating catalyst comprises MoNi on $Al_2O_3$, MoCO on $Al_2O_3$, $MoS_2$, maghemite, $Fe_3O_4$, nickel, NiO, $TiO_2$, $ZrO_2$, $CeO_2$, or combinations thereof.

10. The integrated hydrotreating and hydrocracking process of claim 1, wherein the hydrocracking catalyst comprises an active metal and a support, the active metal comprising NiMo, NiW, or a combination thereof, and the support comprising nano-sized zeolite, hierarchical zeolite, or a combination thereof.

11. The integrated hydrotreating and hydrocracking process of claim 1, wherein the moving-bed hydrotreating reactor has a temperature from 370° C. to 500° C., a pressure from 12 MPa to 16 MPa, or both.

12. The integrated hydrotreating and hydrocracking process of claim 1, wherein the moving-bed hydrotreating reactor has a liquid hourly space velocity from 0.2 $h^{-1}$ to 0.7 $h^{-1}$ and a ratio of hydrogen stream to hydrocarbon oil stream from 800 L/L to 1200 L/L.

13. The integrated hydrotreating and hydrocracking process of claim 1, wherein the hydrocracking reactor has a temperature from 350° C. to 440° C., a pressure from 13 MPa to 16 MPa, or both.

14. The integrated hydrotreating and hydrocracking process of claim 1, wherein the hydrocracking reactor has a liquid hourly space velocity from 0.5 $h^{-1}$ to 1.5 $h^{-1}$ and a ratio of hydrogen stream to the hydrocarbon product stream from 1000 L/L to 2000 L/L.

15. A system for hydrotreating and hydrocracking a hydrocarbon oil stream, the system comprising:
   a moving-bed hydrotreating reactor configured to hydrotreat the hydrocarbon oil stream and a hydrogen stream with a hydrotreating catalyst to hydrotreat the hydrocarbon oil stream and form a hydrotreated hydrocarbon product stream and spent hydrotreating catalyst;
   a hydrocracking reactor fluidly connected to the moving-bed hydrotreating reactor and configured to crack the hydrotreated hydrocarbon product stream and a second hydrogen stream to form a hydrocracked hydrocarbon product stream;
   a stripper fluidly connected to the moving-bed hydrotreating reactor and configured to strip the spent hydrotreating catalyst to form a stripped hydrotreating catalyst; and
   a catalyst regenerator fluidly connected to the stripper and the moving-bed hydrotreating reactor and configured to regenerate the stripped hydrotreating catalyst to form a regenerated hydrotreating catalyst.

16. The system of claim 15, wherein:
   the moving-bed hydrotreating reactor is an ebullated-bed hydrotreating reactor; and
   the catalyst regenerator is configured to send the regenerated hydrotreating catalyst to the moving-bed hydrotreating reactor.

17. The system of claim 15, wherein the system further comprises:
   a catalyst separator fluidly connected to the moving-bed hydrotreating reactor, the hydrocracking reactor, and the stripper, wherein
   the moving-bed hydrotreating reactor is a slurry-bed hydrotreating reactor; and
   the catalyst separator is configured to separate the hydrotreated hydrocarbon product stream from the spent hydrotreating catalyst.

18. The system of claim 15, wherein the system further comprises:
   a presulfiding unit fluidly connected to the catalyst regenerator and the moving-bed hydrotreating reactor, wherein
      the presulfiding unit is configured to presulfide the regenerated hydrotreating catalyst to form a presulfided regenerated hydrotreating catalyst; and
      the presulfiding unit is configured to send the presulfided regenerated hydrotreating catalyst to the moving-bed hydrotreating reactor.

19. The system of claim 15, wherein the hydrocarbon oil stream comprises whole crude oil, topped crude oil, or both.

20. The system of claim 15, wherein the system further comprises:
   a separator fluidly connected to the hydrocracking reactor and configured to separate the hydrocracked hydrocarbon product stream into a light fraction stream comprising $C_1$-$C_4$ hydrocarbons, hydrogen sulfide, hydrogen, ammonia, or combinations thereof and a heavy hydrocarbon fraction stream comprising $C_{5+}$ hydrocarbons;
   a scrubbing unit fluidly connected to the separator and configured to separate the $C_1$-$C_4$ hydrocarbons and hydrogen from the hydrogen sulfide and ammonia;
   a pressure swing adsorption (PSA) unit fluidly connected to the scrubbing unit and configured to separate the hydrogen from the $C_1$-$C_4$ hydrocarbons;
   a methane cracking unit fluidly connected to the scrubbing unit and configured to crack the $C_1$-$C_4$ hydrocarbons and separate methane from $C_2$-$C_4$ hydrocarbons;
   a steam cracking unit fluidly connected to the separator and methane cracking unit and configured to steam crack the $C_2$-$C_4$ hydrocarbons and the $C_{5+}$ hydrocarbons; and
   an aromatization process unit fluidly connected to the steam cracking unit and configured to separate aromatic hydrocarbons from the $C_2$-$C_{5+}$ hydrocarbons.

* * * * *